United States Patent
Maxim (10) Patent No.: US 9,619,918 B2
(45) Date of Patent: Apr. 11, 2017

(54) HETEROGENIOUS 3D GRAPHICS PROCESSOR AND CONFIGURATION METHOD THEREOF

(75) Inventor: Kazakov Maxim, Musashino (JP)

(73) Assignee: DIGITAL MEDIA PROFESSIONALS INC., Tokyo (JP)

(*) Notice: Subject to any disclaimer, the term of this patent is extended or adjusted under 35 U.S.C. 154(b) by 304 days.

(21) Appl. No.: 14/112,938

(22) PCT Filed: Apr. 27, 2012

(86) PCT No.: PCT/JP2012/002907
§ 371 (c)(1),
(2), (4) Date: Oct. 21, 2013

(87) PCT Pub. No.: WO2012/147364
PCT Pub. Date: Nov. 1, 2012

(65) Prior Publication Data
US 2014/0055453 A1 Feb. 27, 2014

(30) Foreign Application Priority Data
Apr. 28, 2011 (JP) .................................. 2011-102051

(51) Int. Cl.
*G06T 15/00* (2011.01)
*G06T 1/20* (2006.01)

(52) U.S. Cl.
CPC ............... *G06T 15/00* (2013.01); *G06T 1/20* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,274,365 B1 * | 9/2007 | Dunn ...................... | G06T 15/04 345/426 |
| 7,505,036 B1 * | 3/2009 | Baldwin ............... | G06T 15/503 345/419 |
| 7,623,132 B1 | 11/2009 | Bastos et al. | |
| 7,706,633 B2 | 4/2010 | Chefd'hotel et al. | |
| 7,777,748 B2 | 8/2010 | Bakalash et al. | |
| 7,852,346 B1 | 12/2010 | Donovan et al. | |
| 7,865,894 B1 | 1/2011 | Nordquist et al. | |

(Continued)

FOREIGN PATENT DOCUMENTS

| JP | 2006-243937 A | 9/2006 |
|---|---|---|
| JP | 2008-299662 A | 12/2008 |

OTHER PUBLICATIONS

International Search Report of international patent application No. PCT/JP2012/002907 completed on Jun. 1, 2012 and mailed Jun. 12, 2012 (1 page).

*Primary Examiner* — Barry Drennan
*Assistant Examiner* — Jason Pringle-Parker
(74) *Attorney, Agent, or Firm* — Pyprus Pte Ltd (57) ABSTRACT

To provide assemble programmable and fixed function pipeline parts of a 3D graphics processor, combining flexibility of programmable pipeline for each stage and small gate size and speed of fixed function pipeline. The graphic processor couples a programmable unit with the texture sampling unit 16 and the fixed function unit 17 in parallel. The arbiter unit 18 and the texture sampling unit 16 are directly connected and the arbiter unit 18 and the fixed function unit 17 are also directly connected.

10 Claims, 8 Drawing Sheets

(56) References Cited

U.S. PATENT DOCUMENTS

| | | | |
|---|---|---|---|
| 7,911,480 B2 | 3/2011 | Brothers | |
| 7,986,325 B1 * | 7/2011 | Gold | G06T 1/60 345/506 |
| 2002/0126124 A1 * | 9/2002 | Baldwin | G09G 5/39 345/533 |
| 2006/0050077 A1 * | 3/2006 | D'Amora | G06F 9/3879 345/567 |
| 2006/0082578 A1 | 4/2006 | Ohbuchi | |
| 2009/0147017 A1 * | 6/2009 | Jiao | G06T 15/04 345/582 |
| 2009/0284535 A1 * | 11/2009 | Pelton | G06T 15/005 345/505 |
| 2009/0315909 A1 * | 12/2009 | DeLaurier | G09G 5/363 345/589 |
| 2010/0328309 A1 * | 12/2010 | Sarel | G06T 15/04 345/426 |

* cited by examiner

HETEROGENIOUS 3D GRAPHICS PROCESSOR AND CONFIGURATION METHOD THEREOF

TECHNICAL FIELD

The present invention relates to the architecture of the heterogeneous 3D graphics processors, and in particular to the way of combining and interoperation of both programmable and fixed function pipeline parts within the same graphics pipeline stage of a heterogeneous 3D graphics processor. Another area of this invention relates to the way of configuring such heterogeneous graphics pipeline from the 3D graphics application program point of view.

BACKGROUND OF THE INVENTION

Hardware 3D graphics processors represent pipelines composed of several stages chained together where each stage performs processing of a certain type of graphics elements such as vertices, geometrical primitives and pixels (or fragments) of the final image and outputs of a stage being inputs for a following stage. Evolution of 3D hardware pipeline implementations went from the fixed function, configurable ones to the flexible, programmable ones with different degree of programmability in the various pipeline stages. For example, for certain designs a programmable vertex stage was followed by a completely fixed-function configurable fragment stage, like in PICA200 series of 3D graphics accelerators of Digital Media Professionals, Inc. Being more general in their operations, programmable pipeline stages are less efficient in the terms of performance and gate size compared to the fixed function pipeline implementations, but the benefits of greater flexibility for programmable pipelines eventually eliminated fixed-function implementations from the space of desktop 3D graphics processors. Meanwhile, embedded space applications still enforce limitations in available gate size and power consumption, thus causing most of the commercial 3D HW implementations in embedded space to be only partially programmable at best (having heterogeneous design with respect to programmability of vertex/geometry transformation and fragment rasterization parts) or have noticeably reduced performance for the fully programmable designs compared to the fixed-function ones on certain operations. Thus, in embedded space there exists a need for a design that combines performance and low power consumption of the fixed function 3D HW pipelines with flexibility of the programmable ones, and (unlike applications in desktop space) such a need is critical as inability to meet power consumption limitations will most likely prevent 3D HW pipeline implementation from the use in embedded space product.

The specification of U.S. Pat. No. 7,865,894 discloses distributing processing tasks within a processor.

The specification of U.S. Pat. No. 7,852,346 discloses a programmable graphic processor for generalized texturing.

The specification of U.S. Pat. No. 7,623,132 discloses a programmable shader having register forwarding for reduced register file bandwidth consumption.

The specification of U.S. Pat. No. 7,706,633 discloses GPU-based image manipulation method for registration applications.

The specification of U.S. Pat. No. 7,777,748 discloses PC-level computing system with a multi-mode parallel graphic rendering subsystem employing an automatic mode controller, responsive to performance data collected during the run-time of graphic applications.

The specification of U.S. Pat. No. 7,911,480 discloses compression of multiplesample antialiasing tile data in a graphic pipeline The specification of US2006/0082578 discloses an image processor, image processing method and image processing program product. All of the contents in these references are incorporated herein by reference.

CITATION LIST

Patent Literature

Patent Literature 1: The specification of U.S. Pat. No. 7,865,894
Patent Literature 2: The specification of U.S. Pat. No. 7,852,346
Patent Literature 3: The specification of U.S. Pat. No. 7,623,132
Patent Literature 4: The specification of U.S. Pat. No. 7,706,633
Patent Literature 5: The specification of U.S. Pat. No. 7,777,748
Patent Literature 6: The specification of U.S. Pat. No. 7,911,480
Patent Literature 7: The specification of US2006/0082578

SUMMARY OF INVENTION

Technical Problem

Traditional way to achieve both merits of flexibility and high performance realized in a gate efficient way is to assemble the processing pipeline from both fixed-function stages (e.g. in rasterization/pixel processing) and programmable ones (vertex and geometry transformation). Still, this approach limits flexibility of certain pipeline parts and, therefore, of the whole design. Thus, there exists a need to assemble programmable and fixed function pipeline parts of a 3D graphics processor in a more efficient way, combining flexibility of programmable pipeline for each stage and small gate size and speed of fixed function pipeline.

Fixed and fully programmable pipelines differ substantially in the way of configuration that is reflected in the application programming interface the graphics applications employ. For a fixed function pipeline a dedicated API function or set of functions is used to configure a certain portion of pipeline functionality as configuration parameters differ substantially from one fixed function pipeline part to another. Instead, the programmable pipeline is configured using the same API regardless of the actual shader program executed by it and its effective functionality. Thus, for a heterogeneous pipeline the configuration issues are challenging both for a graphics application and for the content creation tools supplying data for the application because the way of configuration differs substantially for various parts of the graphics pipeline. Moreover, certain APIs like OpenGL ES 2.0 used extensively in the nowadays 3D graphics applications do not support heterogeneous graphics pipelines and their designers intentionally excluded API functions for the fixed function pipeline parts from it. Thus, there exists a need to provide a way of configuring fixed function pipeline portions in the heterogeneous 3D graphics processors that is unified with the configuration way for the programmable pipeline parts.

Solution to Problem

Figure 8:
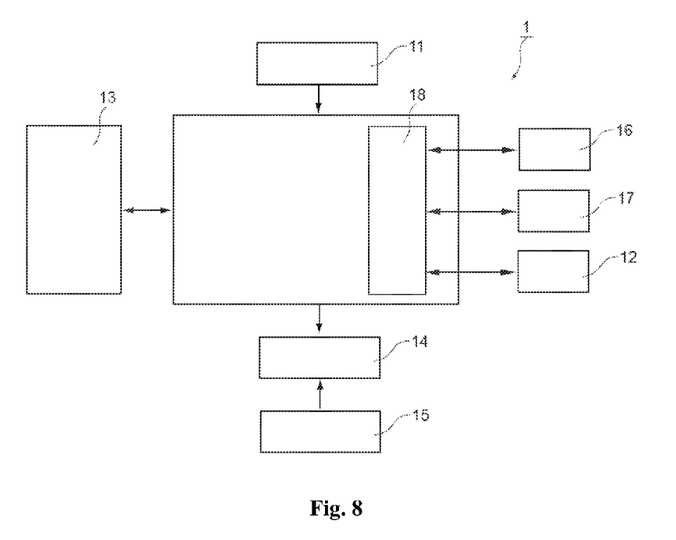
FIG. 8 is a block diagram of the present invention.

The first aspect of the invention directs to a graphic processor that has an arbiter unit 18 as shown in FIG. 8. The arbiter unit 18 couples a programmable unit with the texture sampling unit 16 and the fixed function unit 17 in parallel. The arbiter unit 18 and the texture sampling unit 16 are directly connected and the arbiter unit 18 and the fixed function unit 17 are also directly connected. The arbiter unit 18 delivers a processing request to the texture sampling unit 16 or the dedicated fixed function unit 17. The processing request is a result of program execution performed by a one or a plurality of programmable units 12. The arbiter unit 18 delivers the processing result from the texture sampling unit 16 or the dedicated fixed function unit 17 to said one or a plurality of programmable units 12.

The graphic processor 1 of the first aspect of the invention is a graphic processor for rendering 3D scenes. The processor 1 comprises a command interface unit 11, one or a plurality of programmable units 12, a rasterizer unit 13, a color updater unit 14, a texture sampling unit 16, one or a plurality of dedicated fixed function units 17, and an arbiter unit 18.

The command interface unit 11 fetches commands and vertex data from host computer to configure the graphic processor parts. The command interface unit 11 fetches vertex data for the scene and delivers them to the rest of the graphic processor parts. The unit may forward fetched information toward the programmable units 12.

One or a plurality of programmable units 12 performs scene geometry processing to obtain geometric primitives and per-fragment processing results using the commands and the vertex data from the command interface unit 11. The programmable units 12 perform geometry processing and execute processing for the rasterized scene elements.

The rasterizer unit 13 receives geometric primitives from said one or a plurality of programmable units 12 and converts the geometric primitives into fragments. The fragments are processed by the programmable unit 12.

The color updater unit 14 receives the per-fragment processing results from said one or a plurality of programmable units 12 and a content stored at the fragments framebuffer 15 for merging the per-fragment processing results with the content stored at the fragments framebuffer 15. The fragments framebuffer 15 stores contents for each fragment. The color updater unit 14 merges the per fragment processing results with the previous contents of the fragment so as to renew the per fragment content.

The texture sampling unit 16 fetches filtered texture samples when the unit 16 receives request from a one or a plurality of programmable units 12. The texture sampling unit 16 can access the database that store texture information and obtain texture data.

One or pluralities of dedicated fixed function units 17 implement certain parts of per-fragment processing calculations. The dedicated fixed function units 17 may implement certain parts of per-fragment processing calculations in a hardwired way. The examples of the per-fragment processing calculations are fragment shading calculations, color blending calculations, procedural texture sampling calculations. The programmable units 12 may install one or more programs that make the dedicated fixed function units 17 execute certain parts of per-fragment processing calculations. The programmable units 12 may obtain such programs from host or a database that stores programs. The programmable units 12 may store the programs based on the command from host which the command interface unit 11 fetches.

The arbiter unit 18 couples the programmable unit 12 with the texture sampling unit 16 and the fixed function units 17 in parallel. Namely, the arbiter unit 18, which is a part of the programmable unit 12, is directly connected with the texture sampling unit 16. Further the arbiter unit 18 is directly connected with the fixed function units 17.

The arbiter unit 18 delivers a processing request to the texture sampling unit 16 or the dedicated fixed function units 17, the processing request being a result of program execution performed by said one or a plurality of programmable units 12, and delivers the processing result from the texture sampling unit 16 or the dedicated fixed function units 17 to said one or a plurality of programmable units 12.

A preferred embodiment of the invention is that the one of the dedicated fixed function units 17 interacts with the arbiter unit 18 as an another kind of texture sampling unit. The dedicated fixed function unit 17 that acts as an another kind of texture sampling unit may have the same number of inputs and outputs that the texture sampling unit 16 has. The dedicated fixed function unit 17 that acts as another kind of texture sampling unit may have different number of inputs and outputs that the texture sampling unit 16 has.

Embodiments of the present invention facilitate achieving small gate size and speed of fixed function pipeline part and flexibility of programmable pipeline part in a heterogeneous 3D graphics processor architecture by combining those parts in parallel manner instead of traditional sequential one. This way programmable pipeline part can interact with fixed function pipeline part consuming processing results of the latter one or more times during execution of a shader program. In one embodiment the fixed function pipeline parts include fixed function fragment shading calculator, procedural texture evaluation unit, texture blending unit and so on, each part accessed independently by programmable pipeline and operating in parallel with it and each other fixed function pipeline part.

In another embodiment of the present invention, each fixed function pipeline part is interacted with as another type of texture unit with, possibly, different number of inputs and outputs and different latency in obtaining result, thus employing the access latency hiding logic already present to hide texture unit access latency from the programmable pipeline parts.

Embodiments of another aspect of present invention facilitate configuring heterogeneous graphics processors by extending a way of configuration used for the programmable pipeline parts to the configuration of the fixed function pipeline parts.

The second aspect of the invention is directed to a computer program. The computer program is executed by a computer to perform a method for the rendering of 3D computer graphics. The computer comprises the above mentioned graphic processor 1 or the parts of the processor 1.

The processor comprises a command interface unit 11 for fetching commands and vertex data; one or a plurality of programmable units 12 for performing scene geometry processing to obtain geometric primitives and per-fragment processing results using the commands and the vertex data from the command interface unit 11; a texture sampling unit 16 for fetching filtered texture samples upon a request from a one or a plurality of programmable units 12; one or a plurality of dedicated fixed function units 17 for implementing certain parts of per-fragment processing calculations; and an arbiter unit 18 for coupling the programmable unit with the texture sampling unit 16 and one or a plurality of dedicated fixed function units 17 in parallel; the arbiter unit 18 delivering a processing request to the texture sampling unit 16 or the one or a plurality of dedicated fixed function units 17 according to a processing request a one or a plurality of programmable units 12, the processing request being a result of a shader program execution performed by a one or a plurality of programmable units 12, and the arbiter unit 18 delivering the processing result from the texture sampling unit 16 or said one or a plurality of dedicated fixed function units 17 to said one or a plurality of programmable units 12.

The 3D graphics application program run by the computer installs a shader program to be executed by the graphic processor 1 into the one or a plurality of programmable units 12.

Said 3D graphics application program run by the computer discovers the first set of parameters of the shader program by invoking an API function executed by the computer processor. The shader program may be introduced by a shader program developer. The first set of parameters remains constant while the graphic processor 1 executes the shader program.

Said 3D graphics application program run by the computer discovers the second set of parameters to control operations of the one or a plurality of dedicated fixed function units 17. The second set of parameters remains constant while the graphic processor 1 executes the shader program. Said 3D graphics application program run by the computer sets the values for discovered parameters of the first set of parameters by means of invoking an API function one or more times. Said 3D graphics application program run by the computer sets the values for discovered parameters of the second set of parameters by means of invoking an API function one or more times.

The preferred embodiment of the invention is that the invoked API function is particular to the type of the first set of parameters.

The preferred embodiment of the invention is a program storage device readable by a computer. The examples of the program storage device are CD, CD-ROM. DVD, USB memory, SD card, Database and Hard Disc. The program storage device stores the above mentioned 3D graphics application program.

In one of embodiments of present invention the type, name and size information for configuration parameters for the fixed function pipeline parts is exposed via the same API functions as for the parameters for the shader programs executed by the programmable pipeline parts. For setting configuration parameter values for the fixed function pipeline parts the same API functions as for the shader program parameters are employed as well. Therefore, the present invention provides a unified API for configuring heterogeneous graphics pipeline from the 3D graphics application point of view where the way of configuring fixed function pipeline part is the same as of programmable pipeline part.

In one embodiment of the present invention, such configuration method is applied to configure heterogeneous pipeline where both programmable and fixed function pipeline parts are used concurrently in parallel manner.

In yet another embodiment of the present invention, such configuration method is applied to the configuration of a heterogeneous graphics pipeline where one or more graphics pipeline stages (being it a vertex, geometry or fragment processing one) are not programmable. In this case the way of configuring the pipeline is the same as of configuring the fully programmable pipeline with the exclusion of a missing step of specifying shader program source for the fixed function pipeline stage.

Advantageous Effects of Invention

The present invention can provide a processor or a system that can assemble programmable and fixed function pipeline parts in a efficient way, combining flexibility of programmable pipeline for each stage and small gate size and speed of fixed function ones.

DESCRIPTION OF EMBODIMENTS

Figure 1:
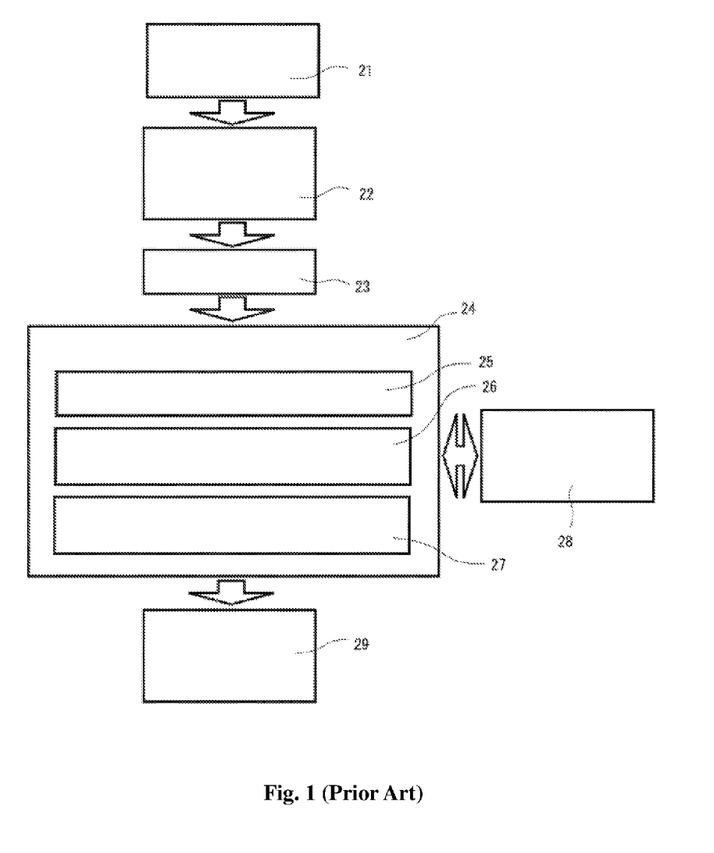
FIG. 1 is a block diagram of a prior art heterogeneous graphics processor combining programmable vertex processing with fixed function fragment processing.

Embodiments of the present invention facilitate achieving small gate size and speed of a fixed function pipeline part and flexibility of a programmable pipeline part in heterogeneous graphics processor architecture and facilitate configuration of heterogeneous graphics processors. FIG. 1 is a block diagram for a prior art heterogeneous graphics processor with programmable vertex processing stage combined sequentially with fixed function fragment processing stage.

The processor of FIG. 1 comprises a command interface unit 21, a programmable shader processing unit 22, a fixed function fragment processing unit 24, a rasterizer unit 23, a texture unit 28, and a color updater unit 29. The fixed function fragment processing unit 24 comprises a fixed function shading unit 25, a fixed function procedural texture unit 26 and a fixed function texture blending unit 27. The fixed function fragment processing unit 24 is configured to be connected with the texture unit 28. Thus the processor of the FIG. 1 can realize fast and gate-efficient way of performing fragment shading calculations but lacks flexibility in its operation.

Figure 2:
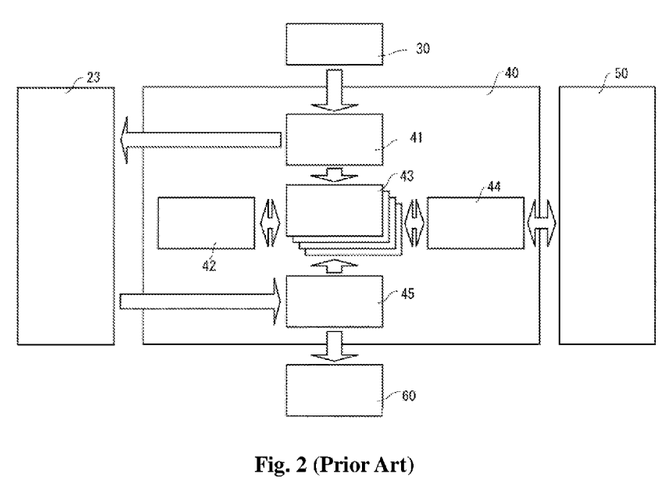
FIG. 2 is a block diagram of a prior art programmable graphics processor having unified shader processor unit executing both vertex and fragment shader programs to realize vertex and fragment shader processing.

FIG. 2 illustrates another example of graphics processor that has fully programmable processing stages realized by shader programs executed on the same set of programmable processing units and using no dedicated fixed function pipeline parts for the fragment processing as for example of FIG. 1 at all.

The processor of FIG. 2 comprises a command interface unit 30, a programmable shader processing unit 40, a rasterizer unit 2300, a texture unit 50, and a color updater unit 60. The programmable shader processing unit 40 comprises a vertex shader task queue 41, a texture pending task queue 42, one or more programmable shader processor units 43, a texture request queue 44, and a fragment shader task queue 45. The processor of FIG. 2 connects the programmable shader processing unit 40 and the texture unit via 50 the texture request queue 44. Thus the processor has flexibility even though the processing speed of the processor is not faster than the processor of FIG. 1 because the processor has no dedicated fixed function pipeline parts and can have only few programmable shader processing units 40 due to gate size limitations of the embedded space implementation.

Figure 3:
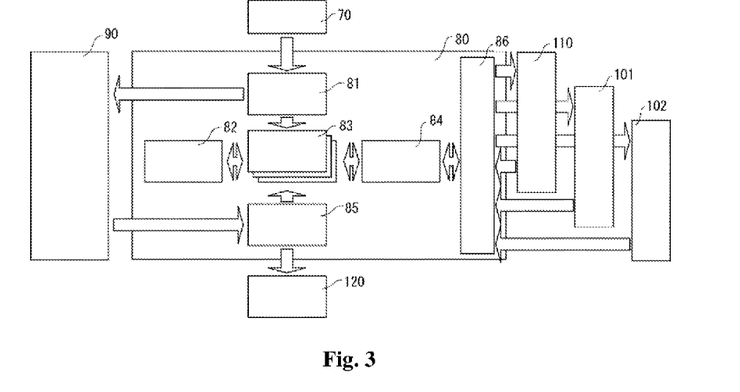
FIG. 3 is a block diagram of a heterogeneous graphics processor according to an embodiment of the present invention.

FIG. 3 is a block diagram of a heterogeneous graphics processor of one embodiment of present invention. Unlike prior art graphics processors, it combines fixed function pipeline parts with fully programmable graphics processor where fixed function pipeline does not replace programmable pipeline stage as in the graphics processor of FIG. 1 but operates in parallel with programmable pipeline state and performs operations on its request.

Similarly to the fully programmable graphics processor of FIG. 2, the graphics processor of the embodiment of FIG. 3 includes a command interface unit 70, a programmable shader processing unit 80, a rasterizer unit 90, a texture unit 110, and a color updater unit 120.

The command interface unit 70 is a part of the system which receives execution commands from host and fetches geometry data from host memory. The unit 70 may be implemented by means of hardware resources. The hardware as well as software may act as the unit 70. All of the units or means in the present invention may be implemented by hardware resources or by both hardware resources and software.

The rasterizer unit 90 is a part which decomposes simple geometry primitives of points, lines and triangles made of vertices transformed by vertex shader program into a set of fragments covered by the primitive on the screen. Rasterizer has already known in the art and thus the processor of the present invention may comprise any types of the rasterizer.

The texture unit 110 is a part which processes texture access requests. Texture unit 110 can access a database which stores texture information and can obtain the texture information stored in the database.

The color updater unit 120 is a part which merges fragment processing results by programmable shader processing unit 80 to the content of a frame buffer.

The programmable shader processor unit 80 is a part which realizes programmable vertex and fragment pipeline processing stages. The unit 80 comprises a vertex shader task queue 81, one or more programmable shader processor units 83, an external device access queue 84, and a fragment shader task queue 85. The unit 80 may further include an external device access pending queue 82. The programmable shader processor unit 80 may comprise other parts to execute other tasks.

The vertex shader task queue 81 is a part which stores a sequence of tasks for the vertex shader stage to process.

The external device access pending queue 82 is a part which stores a sequence of access pending tasks for external devices such as including texture unit and fixed function pipeline parts. The queue 82 may store tasks stalled on pending external device access request completion and thus swapped out of active execution on the shader processors 83.

The one or more programmable shader processor units 83 are parts that fetch available vertex and fragment shader tasks from queues 81 and 85 and execute vertex and fragment shader programs for the processing of the corresponding tasks. The units 83 are configured to be connected with the external device access pending queue 82 and the external device access queue 84.

The external device access queue 84 is a part which stores a sequence of access requests for external devices including texture unit and fixed function pipeline parts like fixed function shading unit and fixed function procedural unit, that makes a difference to the fully programmable graphics processor of FIG. 2 where a similar queue 44 is used to store texture unit access requests only.

The fragment shader task queue 85 is a part that stores fragment shader processing tasks corresponding to the fragments generated by the rasterizer unit 90.

Unlike the programmable graphics processor of FIG. 2 the embodiment of present invention on FIG. 3 additionally includes, an arbiter unit 86, a fixed function shading unit 101 and a fixed function procedural texture unit 102.

As explained the programmable shader processor unit 80 of FIG. 3 further comprises the arbiter unit 86. The arbiter unit 86 a is a part which receives requests from the external device access request queue 84 and dispatches them to two or more external devices that include the texture unit 110 according to a destination device of the request. The arbiter unit 86 receives request completion results back and forwards request completion events to the external device access request queue 84. The arbiter unit 86 is configured to be connected with the fixed function shading unit 101 and the fixed function procedural texture unit 102 by hardware resources. The texture unit 110, the fixed function shading unit 101 and the fixed function procedural texture unit 102 are connected with the arbiter unit 86 in parallel.

The fixed function shading unit 101 is a part which performs a number of light reflection calculations to determine color of the fragment according to a one of configuration selectable light reflection models.

The fixed function procedural texture unit 102 is a part which calculates a texel color for a procedurally defined texture image where a procedure defining the texture is selectable according to the unit's configuration.

It should be appreciated that the embodiment shown herein is illustrative and variations and modifications are possible. The queues 82, 84 and 85 can be realized as collection of the queues each item in collection dedicated to a particular task type. The number of programmable pipeline stages could not be limited by vertex and fragment processing ones. The number of programmable pipeline stages can include several stages of programmable geometry primitive processing. Similarly to queues 81 and 85, the additional queues might be present to keep other task types associated with additional programmable pipeline stages.

In the embodiment of present invention of FIG. 3, the command interface unit 70 processes host system commands by reading and executing command buffers located in a host system memory. The command buffers contain configuration register commands whose execution results in a configuration of the graphics processor and triggering processing of geometry data that resides in host system memory as well as in generating interrupts on the host system indicating completion of one or more geometry data processing requests. The geometry data include index and vertex buffer content fetched by the command interface unit 70 and delivered for processing to the programmable shader processing unit 80. Programmable shader processing unit 80 places vertex data processing requests for the vertex data fetched into vertex shader task queue 81 that serves as a one of input task queues for collection of shader processors 83.

The Shader processors 83 fetch available tasks from the vertex shader task queue 81 and start processing associated vertex data by executing vertex shader program. As processing for a particular task of queue 81 is complete, it is removed from the queue and the results of the vertex processing are sent to the rasterizer unit 90 for assembling simple primitives like point, line or triangle from a sequence of vertices defined by the content of the index buffer fetched by command interface unit 70 or sequence of vertices in the vertex buffer fetched by unit 70 if the index buffer presence was not configured by the host.

The Rasterizer unit 90 performs projection of the assembled primitive into screen space and decomposes it into a set of fragments with their attributes being a result of interpolation between attribute values of vertex data input to rasterizer according to the fragment position on the screen. To process the fragment data a task is created for a group of neighbor fragments and is added into the fragment shader task queue 85. This queue 85 serves as input for the shader processors 83 along with the vertex shader task queue 81. Fragment data associated with items of queue 85 are fetched by the shader processors 83 and processed by executing a fragment shader program by them. Once the fragment processing is finished, a corresponding task item is removed from the queue 85 and fragment processing results are sent to the color updater unit 120 for blending with a content of a destination frame buffer.

During execution of a vertex or fragment shader program by shader units 83, a shader program might require shader unit to request texture sampling result for a particular set of parameters including texture coordinates, texture image identifier specifying a texture image to be sampled, an offset to LOD (level of detail) level and so on. Texture accesses are characterized by long latency times of many tens to several hundred clocks for their completion as memory with long access latency is often employed for storing texture image data. To prevent performance degradation associated with waiting for the texture access result, similarly to the programmable graphics processor of FIG. 2, for the embodiment of present invention of FIG. 3 the task stalled on waiting for texture access result is placed into the external device access pending queue 82 and execution resources in the shader processors 83 for it are reclaimed. At this moment an another task from queues 81, 85 or even from 82 for the tasks having their texture access requests completed is fetched and its execution started or continued. Having sufficient number of available tasks in queues 81, 85 and/or tasks with completed requests from queue 82 it is possible to hide latency of texture access without introduction of additional stall cycles during operation of the shader processors 83. The task of queue 82 is marked as having completed associated texture request as soon as queue 84 is notified about this event by the arbiter unit 86 receiving corresponding indication from texture unit 110.

As texture access latencies are substantial, the size of queues 81, 82, 84, 85 may be sufficient to keep information about tens and hundreds of task items that results in noticeable gate costs but this price is necessary to achieve efficient operation of the shader processors 83 defining the overall performance of the graphics processor.

In the desktop implementation of graphics processors the number of the shader processor units 83 counts from many tens to many hundreds and even thousands. Big groups of those processors are executing the same instruction on multiple data items simultaneously thus achieving high instruction per clock (IPC) ratios that define actual performance of the processor. In the case of embedded space the gate size limitations restrict number of the shader processors to a number of few units, possibly several tens of units. This way effective IPC drops thus resulting in decreased performance of already underpowered embedded space programmable 3D graphics processors.

Complex physically-based light reflection models require several tens of program steps for their evaluation and thus result in many cycles spent to get the result for a few fragments due to low IPC ratios of embedded space graphics processors. For the fixed function pipelines, those complex light reflection models can be implemented with performance of one fragment processed per cycle at an expense of several tens to hundred clock latency in obtaining the result having effective IPC an order of magnitude higher than in their implementation within a shader program. There are some other classes of calculations that can benefit from fixed function pipeline implementation, like procedural texture evaluation and so on.

Substantial latency and high throughput characteristics of fixed function pipeline implementations for such calculations cause little problem when such pipeline parts are chained together and even when operating in a place before or after programmable pipeline stage as done in prior art heterogeneous graphics processor of FIG. 1, but this approach results in limited flexibility of the graphics pipeline as processing results for the fixed function pipeline parts cannot be fed back to the programmable pipeline part within same pipeline stage for additional processing. Instead, in the present invention the fixed function pipeline parts are placed parallel to the programmable stages and operate in parallel with execution of the shader program on the request generated by that shader program with calculation results provided back to the requesting program instance where those can be combined with results produced by the program itself. This way programmable pipeline flexibility is retained while high effective IPC numbers of fixed function pipeline parts are increasing overall performance of the graphics processor.

The biggest challenge of combining fixed function pipeline parts and programmable shader processors is in handling the substantial latencies of the former. However, their latency and high throughput make fixed function pipeline parts similar in their characteristics to the texture units. Present invention is based on exploiting this similarity and employs the same method of big tasks queues for available and request pending tasks to hide the latency in communication with fixed function pipeline parts. In the embodiment of the present invention on FIG. 3 the external device request queue can store request data not only for texture unit, but for fixed function pipeline parts, such as fixed function shading unit 101 and fixed function procedural texture unit 102 as well. The arbiter unit 86 parses destination device information of requests stored in queue 84 and directs the request to a proper device. Similarly to tasks pending a texture access result, a task pending a fixed function pipeline access result is placed into external device access pending queue 82 until associated request is completed and shader processors 83 are having available resources for the execution of additional task. Having enough tasks in queues 81, and 85 tasks with completed requests in queue 82 the goal of hiding the latency of accessing fixed function pipeline parts 101 and 102 is achieved with minimal modification of programmable shader processing unit 80 thus resulting in a minimal gate cost increase that is critical for embedded space applications.

Configuration Method

Figure 4:
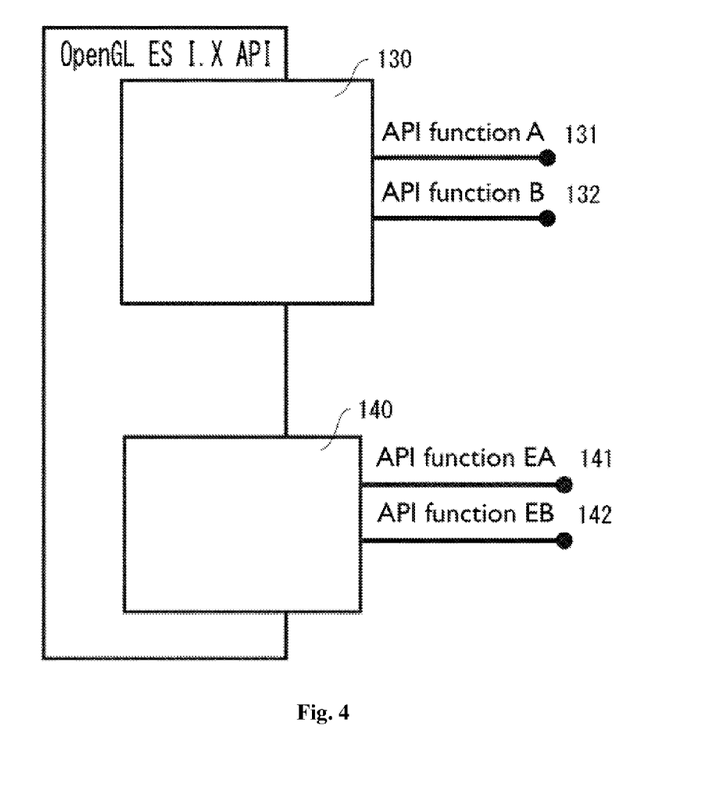
FIG. 4 is a block diagram of OpenGL ES 1.X API along with extension.

Another aspect of the present invention facilitates configuration of heterogeneous pipelines, both prior art ones of FIG. 1 and embodiments of present inventions illustrated on FIG. 3. FIG. 4 is a block diagram of OpenGL ES 1.X API along with extension. As shown in FIG. 4, a part of OpenGL ES 1.X API comprises a fixed function texture blending unit configuration API 130 that has API functions 131, 132 to configure certain aspects of texture blending unit operations. Further the API comprises a fixed function procedural texture unit configuration API extension 140 that has API functions 141, 142 to configure certain aspects of the fixed function procedural texture unit operation.

Figure 6:
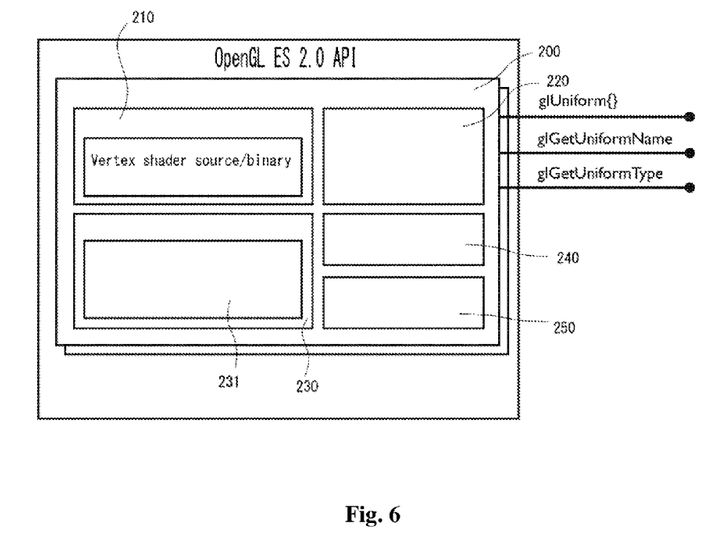
FIG. 6 is a block diagram of OpenGL ES 2.0 API for an embodiment of present invention where shader program object encapsulates state for the fixed function pipeline parts of the embodiment of present invention of FIG. 3.

Unlike prior art approach of OpenGL ES 1.X, API of FIG. 4 supporting configuration of certain fixed function pipeline parts by means of exposing API functions specific for a configuration for each part of the pipeline and prior art approach of OpenGL ES 2.0 not supporting fixed function pipeline parts configuration for vertex and fragment pipeline processing stages altogether, the embodiment of the present invention of FIG. 6 provides a unified API for configuration of both programmable pipeline stages and fixed function pipeline parts within them thus greatly facilitating development of 3D graphics applications running on prior art and proposed heterogeneous 3D graphics processors and development of content creation tools needed for creating content for such applications.

Figure 5:
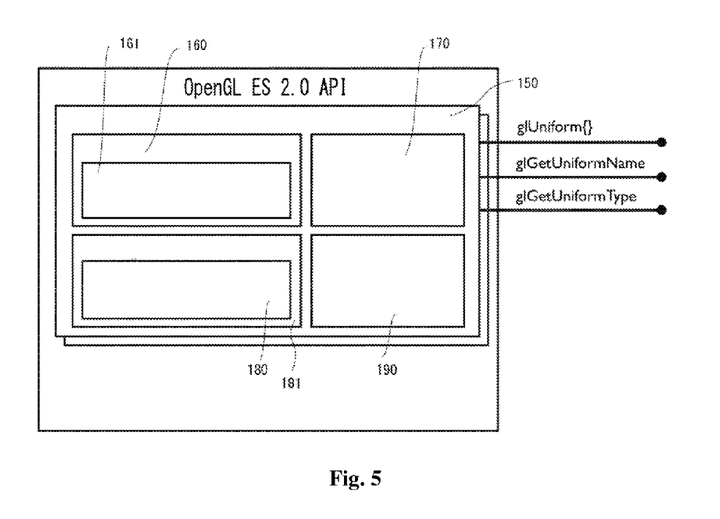
FIG. 5 is a block diagram of OpenGL ES 2.0 API and a shader program object managed by it.

In the case of prior art OpenGL ES 2.0 API of FIG. 5 the API functions are used to create, manipulate and delete program object 150. Once program object 150 is created, it can be configured with a vertex shader object 160 and fragment shader object 170. Upon creation, shader objects 160 and 170 are not associated with any actual shader program but eventually a shader program source in textual or compiled binary form can be specified resulting in a vertex shader object 160 containing vertex shader source or binary object 161 and fragment shader object 170 containing fragment shader source or binary object 181. As a result of processing shader source or binary object a set of configuration parameters, their names and types as specified in the shader program are discovered and configuration storage space for the configuration parameters becomes available for them in the program object 150 in the form of the vertex shader uniform state object 190 and the fragment shader uniform state object 190 where the term 'uniform' is a synonym of configuration parameter in the OpenGL ES 2.0 API terminology. The state objects 170 and 190 form the state of the program object 150 and vertex and fragment shader parameter groups are merged together from the API point of view to form a program state. The information about available parameters for a specific instance of the program object 150 becomes available after linking operation for it is complete and can be discovered by a set of API functions providing number of uniforms, their names, types and allowing to specify and query their values in a unified manner regardless of an actual program object in question and shader program sources within it. For graphics processors complying with the standard defined by OpenGL ES 2.0 API their vertex and fragment processing pipeline stages are fully configured by specifying a program object 150 that is effective at the moment of executing requests to process application-specified geometry data. Thus, there is no way to realize OpenGL ES 2.0 API in such form on prior art heterogeneous graphics processors of FIG. 1 as those have no facilities for execution of fragment shader programs required by OpenGL ES 2.0 program objects 150. Additionally, the embodiments of the present invention in the form of the 3D graphics processor of FIG. 3 could not be supported by OpenGL ES 2.0 API as the program object contains no state to keep the values of configuration parameters for the fixed function pipeline parts introduced with present invention.

In order to overcome such limitations and provide a unified configuration method for heterogeneous graphics processor of FIG. 3 in one embodiment of present invention of FIG. 6 the program object 200 of OpenGL ES API is extended to include a fixed function uniform state object 250, a vertex shader object 210 which contains a vertex shader source/binary object 6201, a vertex shader uniform state object 220, a fragment shader object 230 which contains a fragment shader source/binary object 231 and a fragment shader uniform state object 240.

The list of configuration parameters of the fixed function pipeline parts is added to the uniform list of the program object 200 and exposed via existing program uniform enumeration functions of OpenGL ES 2.0 API such as glGetActiveUniform and glGetUniformLocation. As uniform enumeration API functions do not differentiate between vertex and fragment shader uniforms, no modification is necessary to uniform enumeration functions. Similarly, existing uniform querying/specifying functions of OpenGL ES 2.0 API can be used without any modification for discovering and manipulating the state of fixed function pipeline parts thus greatly simplifying configuration of the heterogeneous 3D graphics processor of FIG. 3.

Figure 7:
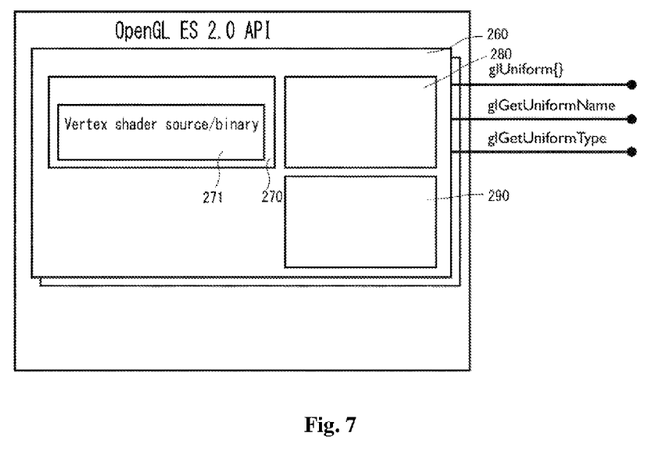
FIG. 7 is a block diagram of OpenGL ES 2.0 API for another embodiment of present invention where shader program object encapsulates state for the fixed function pipeline parts at the absence of programmable fragment shader state for the heterogeneous graphics processor of FIG. 1.

In yet another embodiment of the configuration aspect of present invention illustrated on FIG. 7 a prior art heterogeneous graphics processor of FIG. 1 can be configured using OpenGL ES 2.0 program object configuration API functions if program object 260 controlled by OpenGL ES 2.0 API functions is modified to include a fixed function uniform state object 290, a vertex shader object 270 which contains a vertex shader source/binary object 271, a vertex shader uniform state object 280.

In such embodiment the fixed function uniform state object 290 completely describes the state of the whole fragment processing pipeline stage. The steps to specify the shader objects for the program object 290 omit the step of specifying fragment shader object or take certain predefined value as an identifier of the fragment shader object thus mimicking program object specification steps from the OpenGL ES 2.0 API point of view. This way an OpenGL ES 2.0 graphics application can be trivially modified to deploy heterogeneous graphics processor of FIG. 1.

INDUSTRIAL APPLICABILITY

The present invention is used in computer industry and amusement industry.

The invention claimed is:

1. A graphic processor for rendering 3D scenes, the processor comprising:
   a command interface unit for fetching commands and vertex data;
   one or a plurality of programmable units that perform scene geometry processing to obtain geometric primitives and per-fragment processing results using the commands and the vertex data from the command interface unit;

a rasterizer unit, which receives the geometric primitives from said one or a plurality of programmable units, that converts the geometric primitives into fragments;

a color updater unit, which receives the per-fragment processing results from said one or a plurality of programmable units and a content stored at a fragments framebuffer, that merges the per-fragment processing results and the content;

a texture sampling unit that fetches filtered texture samples upon a request from the one or a plurality of programmable units;

one or a plurality of dedicated fixed function units that implement certain parts of per-fragment processing calculations; and an arbiter unit that couples the programmable unit with the texture sampling unit and one or a plurality of dedicated fixed function units in parallel;

wherein the arbiter unit delivers a processing request to the texture sampling unit or said one or a plurality of dedicated fixed function units, the processing request being a result of program execution performed by the one or a plurality of programmable units, and delivers the processing result from the texture sampling unit or the one or a plurality of dedicated fixed function units to the one or a plurality of programmable units, wherein said one or a plurality of dedicated fixed function units comprises a fixed function shading unit that performs light reflection calculation to determine color of a fragment, which is used in rendering 3D scenes, according to a fixed light reflection model, wherein the arbiter unit parses destination device information of requests stored in a queue.

2. The graphic processor in accordance with claim 1, wherein said one or a plurality of dedicated fixed function units interacts with the arbiter unit as a second texture sampling unit, wherein number of input and output of said one or a plurality of dedicated fixed function units is different from number of input and output of the texture sampling unit.

3. A computer that executes a computer program to perform method for rendering 3D computer graphics, wherein the computer comprises a graphic processor and the graphic processor comprises:

a command interface unit that fetches commands and vertex data;

one or a plurality of programmable units that performs scene geometry processing to obtain geometric primitives and per-fragment processing results using the commands and the vertex data from the command interface unit;

a texture sampling unit that fetches filtered texture samples upon a request from the one or a plurality of programmable units;

one or a plurality of dedicated fixed function units that implement certain parts of pre-fragment processing calculations; and an arbiter unit that couples the programmable unit with the texture sampling unit and one or a plurality of dedicated fixed function units in parallel;

the arbiter unit being configured to deliver a processing request to the texture sampling unit or the one or a plurality of dedicated fixed function units, the processing request being a result of program execution performed by the one or a plurality of programmable units, and the arbiter unit being configured to deliver the processing result from the texture sampling unit or the one or a plurality of dedicated fixed function units to the one or a plurality of programmable units, wherein said one or a plurality of dedicated fixed function units comprises a fixed function shading unit that performs light reflection calculation to determine color of a fragment, which is used in rendering 3D scenes, according to a fixed light reflection model, wherein the arbiter unit parses destination device information of requests stored in a queue; wherein the method comprises the steps of:

installing a shader program to be executed by the graphic processor into the one or a plurality of programmable units;

discovering a first set of parameters of the shader program, the first set of parameters remaining constant while the graphic processor executes the program, by means of invoking an Application Programming Interface (API) function;

and discovering a second set of parameters to control operations of the one or a plurality of dedicated fixed function units, the second set of parameters remaining constant while the graphic processor executes the program, by means of invoking the API function;

and setting the values for discovered parameters of the first set by means of invoking the API function one or more times;

and setting the values for discovered parameters of the second set by means of invoking the API function one or more times.

4. The computer in accordance with claim 3, wherein the API functions are particular to type of the first set of parameters.

5. A computer program storage device readable by a computer, tangibly embodying the computer program in accordance with claim 3.

6. A graphic processor for rendering 3D scenes, the processor comprising:

a command interface unit for fetching commands and vertex data;

one or a plurality of programmable units that perform scene geometry processing to obtain geometric primitives and per-fragment processing results using the commands and the vertex data from the command interface unit;

a rasterizer unit, which receives the geometric primitives from said one or a plurality of programmable units, that converts the geometric primitives into fragments;

a color updater unit, which receives the per-fragment processing results from said one or a plurality of programmable units and a content stored at a fragments framebuffer, that merges the per-fragment processing results and the content;

a texture sampling unit that fetches filtered texture samples upon a request from the one or a plurality of programmable units;

one or a plurality of dedicated fixed function units that implement certain parts of per-fragment processing calculations; and an arbiter unit that couples the programmable unit with the texture sampling unit and one or a plurality of dedicated fixed function units in parallel;

wherein the arbiter unit delivers a processing request to the texture sampling unit or said one or a plurality of dedicated fixed function units, the processing request being a result of program execution performed by the one or a plurality of programmable units, and delivers the processing result from the texture sampling unit or the one or a plurality of dedicated fixed function units to the one or a plurality of programmable units, wherein said one or a plurality of dedicated fixed function units comprises a fixed function shading unit that performs light reflection calculation to determine color of a fragment, which is used in rendering 3D scenes, according to a fixed light reflection model, wherein the arbiter unit controls a task which makes a texture access result be pending and a task which makes a fixed function pipeline access result be pending to be placed into a queue.

7. The graphic processor in accordance with claim 6, wherein said one or a plurality of dedicated fixed function units interacts with the arbiter unit as a second texture sampling unit, wherein number of input and output of said one or a plurality of dedicated fixed function units is different from number of input and output of the texture sampling unit.

8. A computer that executes a computer program to perform method for rendering 3D computer graphics, wherein the computer comprises a graphic processor and the graphic processor comprises:

a command interface unit that fetches commands and vertex data;

one or a plurality of programmable units that performs scene geometry processing to obtain geometric primitives and per-fragment processing results using the commands and the vertex data from the command interface unit;

a texture sampling unit that fetches filtered texture samples upon a request from the one or a plurality of programmable units;

one or a plurality of dedicated fixed function units that implement certain parts of pre-fragment processing calculations;

and an arbiter unit that couples the programmable unit with the texture sampling unit and one or a plurality of dedicated fixed function units in parallel;

the arbiter unit being configured to deliver a processing request to the texture sampling unit or the one or a plurality of dedicated fixed function units, the processing request being a result of program execution performed by the one or a plurality of programmable units, and the arbiter unit being configured to deliver the processing result from the texture sampling unit or the one or a plurality of dedicated fixed function units to the one or a plurality of programmable units, wherein said one or a plurality of dedicated fixed function units comprises a fixed function shading unit that performs light reflection calculation to determine color of a fragment, which is used in rendering 3D scenes, according to a fixed light reflection model, wherein the arbiter unit controls a task which makes a texture access result be pending and a task which makes a fixed function pipeline access result be pending to be placed into a queue;

wherein the method comprises the steps of:

installing a shader program to be executed by the graphic processor into the one or a plurality of programmable units;

discovering a first set of parameters of the shader program, the first set of parameters remaining constant while the graphic processor executes the program, by means of invoking an Application Programming Interface (API) function;

and discovering a second set of parameters to control operations of the one or a plurality of dedicated fixed function units, the second set of parameters remaining constant while the graphic processor executes the program, by means of invoking the API function;

and setting the values for discovered parameters of the first set by means of invoking the API function one or more times;

and setting the values for discovered parameters of the second set by means of invoking the API function one or more times.

9. The computer in accordance with claim 8, wherein the API functions are particular to type of the first set of parameters.

10. A computer program storage device readable by a computer, tangibly embodying the computer program in accordance with claim 8.

* * * * *